(12) United States Patent
Jiang et al.

(10) Patent No.: US 12,200,082 B2
(45) Date of Patent: Jan. 14, 2025

(54) MICROSERVICE CALL METHOD AND APPARATUS, DEVICE, AND MEDIUM

(71) Applicant: Huawei Cloud Computing Technologies Co., Ltd., Gui'an New District (CN)

(72) Inventors: Yu Jiang, Beijing (CN); Hongwei Sun, Beijing (CN); Keyong Sun, Gui'an (CN); Xiaoming Bao, Beijing (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 296 days.

(21) Appl. No.: 17/941,878

(22) Filed: Sep. 9, 2022

(65) Prior Publication Data
US 2023/0046979 A1    Feb. 16, 2023

Related U.S. Application Data

(63) Continuation of application No. PCT/CN2021/074540, filed on Jan. 30, 2021.

(30) Foreign Application Priority Data

Mar. 12, 2020  (CN) .......................... 202010168547.8
Mar. 24, 2020  (CN) .......................... 202010212312.4

(51) Int. Cl.
*H04L 67/60* (2022.01)
(52) U.S. Cl.
CPC ................................... *H04L 67/60* (2022.05)
(58) Field of Classification Search
None
See application file for complete search history.

(56) References Cited

U.S. PATENT DOCUMENTS

| 2017/0230349 A1 | 8/2017 | Gaur et al. |
| 2019/0197148 A1 | 6/2019 | Engstrand et al. |
| 2022/0109741 A1 | 4/2022 | Chen et al. |

FOREIGN PATENT DOCUMENTS

| CN | 106453288 A   | 2/2017 |
| CN | 107766205 A * | 3/2018 .......... G06F 11/3065 |

(Continued)

OTHER PUBLICATIONS

Xia Zhuang, "Api Gateway Architecture Design Example," Information system engineering, Exchange of Experience, Total 3 pages (May 20, 2018). With an English abstract.

*Primary Examiner* — Natisha D Cox
(74) *Attorney, Agent, or Firm* — Leydig, Voit & Mayer, Ltd.

(57) ABSTRACT

A microservice call method is provided. The method includes: a network interface card receives service call requests separately generated by a plurality of first services deployed on a first device, where each of the plurality of first services is corresponding to one second service, and the second service is used to process first data of a service call request generated by the first service corresponding to the second service; and the network interface card sends the service call request to the second service based on service governance logic related to the first data. In this way, a problem that contention of a plurality of proxies for a system resource causes process context switching and further causes a sharp increase in a service delay is resolved, and application performance is improved.

18 Claims, 5 Drawing Sheets

(56) References Cited

FOREIGN PATENT DOCUMENTS

| | | | | |
|---|---|---|---|---|
| CN | 108306917 A | | 7/2018 | |
| CN | 109688191 A | | 4/2019 | |
| CN | 109995713 A | * | 7/2019 | ......... H04L 67/1008 |
| CN | 110401696 A | | 11/2019 | |
| CN | 110430065 A | | 11/2019 | |
| CN | 112055039 A | * | 12/2020 | ............. H04L 67/10 |

* cited by examiner

MICROSERVICE CALL METHOD AND APPARATUS, DEVICE, AND MEDIUM

CROSS-REFERENCE TO RELATED APPLICATIONS

This application is a continuation of International Application No. PCT/CN2021/074540, filed on Jan. 30, 2021, which claims priority to Chinese Patent Application No. 202010168547.8, filed on Mar. 12, 2020 and Chinese Patent Application No. 202010212312.4, filed on Mar. 24, 2020. All of the aforementioned patent applications are hereby incorporated by reference in their entireties.

TECHNICAL FIELD

This application relates to the field of computer technologies, and in particular, to a microservice call method and apparatus, a device, and a computer-readable storage medium.

BACKGROUND

When developers use conventional monolithic architectures to develop applications, for example, large-scale applications such as a customer relationship management (CRM) system and an enterprise resource planning (ERP) system, it becomes more difficult for the developers to update and repair these large-scale monolithic applications as new requirements continuously increase. Based on this, the industry proposes a new architecture, that is, a microservice architecture.

The microservice architecture aims to break down functions into discrete services to decouple solutions. In this way, developers can easily update and repair applications. In addition, a fault of one service does not affect an entire application, so that robustness of the application is improved.

Currently, in the industry, a service mesh is mainly used (that is, an independent proxy, which is also referred to as a side car side car, is configured for each microservice) to migrate an application to a microservice framework for development. However, this method greatly increases a service call delay and reduces application performance.

SUMMARY

This application provides a microservice call method, to resolve a problem of application performance deterioration caused by a sharp increase in a service call delay in a conventional microservice framework. This application further provides an apparatus, a device, a computer-readable storage medium, and a computer program product corresponding to the microservice call method.

According to a first aspect, this application provides a microservice call method. In this method, functions to be implemented by distributed proxies are implemented by a network interface card. The network interface card receives service call requests separately generated by a plurality of first services deployed on a first device, where each of the plurality of first services is corresponding to one second service, and the second service is used to process first data of a service call request generated by the first service corresponding to the second service. Then, the network interface card sends the service call request to the second service based on service governance logic related to the first data. The network interface card is used to replace a proxy in a microservice framework, so that low intrusiveness is maintained. In addition, the network interface card can process together service call requests initiated by different services. This avoids a problem that contention of proxies for a system resource such as a central processing unit (CPU) causes process context switching and further causes an increase in a service call delay, and improves application performance.

In addition, processing the service call requests together by using the network interface card avoids occupation of a large quantity of resources caused by contention of different proxies, and improves resource utilization.

In some possible implementations, there may be a plurality of devices on which second services are deployed. Therefore, the network interface card may determine, based on the service governance logic related to the first data, such as load balancing logic, an address of a second device providing the second service, and then the network interface card sends the service call request to the second service based on the address of the second device. In this way, functions such as service discovery, load balancing, encryption, identity authentication, authorization, and circuit breaker can be decoupled from a microservice, and low intrusiveness can be maintained.

In some possible implementations, in consideration of security, the network interface card may further perform traffic check for the service call request, to avoid a case in which a service provider cannot normally provide a service because an outlaw frequently sends service call requests. The network interface card may send a traffic check request to a governance center, where the traffic check request is used to perform traffic check for N service call requests, and N is a positive integer. Then, the network interface card receives a traffic check result sent by the governance center, and sends the service call request to the second service when the traffic check result indicates that the check succeeds. The network interface card is used to send service call requests to the governance center in batches for traffic check. This can avoid extra transmission overheads caused when different proxies separately send service call requests to the governance center, and reduce overheads of interaction between the network interface card and the governance center in terms of data.

In some possible implementations, in consideration of traceability, the network interface card may further generate a service call log for query and use when a service is abnormal. The network interface card may receive a service call response sent by the second service, where the service call response includes second data obtained by processing the first data by the second service. Then, the network interface card may generate a service call log based on at least one of the service call request and the service call response. Subsequently, the network interface card sends the service call log to a data collection center in batches. Compared with a method in which different proxies separately send service call logs to the data collection center, this method can greatly reduce overheads of interaction between the network interface card and the data collection center in terms of data.

In some possible implementations, in consideration that an exception such as breakdown may occur on a device (that is, a service provider) that provides a service, to avoid sending the service call request to an invalid service provider, the network interface card may further subscribe to a change message for a service provider list. In this way, the network interface card may determine, from a changed service provider list, the address of the second device providing the second service. In this way, service reliability can be improved.

In some possible implementations, in consideration that a service governance rule may change, the network interface card may further subscribe to a change message for the service governance rule. In this way, the network interface card may run the service governance logic for the first data according to a changed service governance rule, to perform service governance.

In some possible implementations, the network interface card is a smart network interface card. The smart network interface card is a programmable network interface card, and may be configured to assist a CPU in processing network traffic and the like. In an example, the smart network interface card may be a network interface card in which a field-programmable gate array (FPGA) is embedded.

According to a second aspect, this application provides a microservice call method. In this method, functions to be implemented by distributed proxies are implemented by a network interface card. The network interface card receives service call requests sent by a plurality of first services, where each of the plurality of first services is corresponding to one second service, and the second service is used to process first data of a service call request generated by the first service corresponding to the second service. Then, the network interface card sends the service call request to the second service. Subsequently, the network interface card receives a service call response sent by the second service, where the service call response includes second data obtained by processing the first data by the second service. Finally, the network interface card sends the service call response to the first service corresponding to the second service.

The network interface card is used to replace a proxy in a microservice framework, so that low intrusiveness is maintained. In addition, the network interface card can process together service call requests initiated by different services. This avoids a problem that contention of proxies for a system resource such as a CPU causes process context switching and further causes an increase in a service call delay, and improves application performance.

In some possible implementations, the network interface card generates a service call log based on at least one of the service call request and the service call response, and then the network interface card sends the service call log to a data collection center in batches. Compared with a method in which different proxies separately send service call logs to the data collection center, this method can greatly reduce overheads of interaction between the network interface card and the data collection center in terms of data.

In some possible implementations, the network interface card is a smart network interface card. The smart network interface card is programmable. In an example, the smart network interface card may be a network interface card in which an FPGA is embedded.

According to a third aspect, this application provides a microservice call apparatus. The apparatus includes:
a communications module, configured to receive service call requests separately generated by a plurality of first services deployed on a first device, where each of the plurality of first services is corresponding to one second service, and the second service is used to process first data of a service call request generated by the first service corresponding to the second service.

The communications module is further configured to send the service call request to the second service based on service governance logic related to the first data.

In some possible implementations, the communications module is configured to:
determine, based on the service governance logic related to the first data, an address of a second device providing the second service; and
send the service call request to the second service based on the address of the second device.

In some possible implementations, the communications module is further configured to:
send a traffic check request to a governance center, where the traffic check request is used to perform traffic check for N service call requests, and N is a positive integer;
receive a traffic check result sent by the governance center; and
send the service call request to the second service when the traffic check result indicates that the check succeeds.

In some possible implementations, the communications module is further configured to:
receive a service call response sent by the second service, where the service call response includes second data obtained by processing the first data by the second service.

The apparatus further includes:
a generation module, configured to generate a service call log based on at least one of the service call request and the service call response.

The communications module is further configured to:
send the service call log to a data collection center in batches.

In some possible implementations, the apparatus further includes:
a subscription module, configured to subscribe to a change message for a service provider list, to determine, from a changed service provider list, the address of the second device providing the second service.

In some possible implementations, the apparatus further includes:
the subscription module, configured to subscribe to a change message for a service governance rule; and
a service governance module, configured to run the service governance logic for the first data according to a changed service governance rule.

In some possible implementations, the network interface card is a smart network interface card.

According to a fourth aspect, this application provides a microservice call apparatus. The apparatus includes:
a communications module, configured to receive service call requests sent by a plurality of first services, where each of the plurality of first services is corresponding to one second service, and the second service is used to process first data of a service call request generated by the first service corresponding to the second service.

The communications module is further configured to send the service call request to the second service.

The communications module is further configured to receive a service call response sent by the second service, where the service call response includes second data obtained by processing the first data by the second service.

The communications module is further configured to send the service call response to the first service corresponding to the second service.

In some possible implementations, the apparatus further includes:

a generation module, configured to generate a service call log based on at least one of the service call request and the service call response.

The communications module is further configured to send the service call log to a data collection center in batches.

In some possible implementations, the network interface card is a smart network interface card.

According to a fifth aspect, this application provides a network interface card. The network interface card includes a processor and a memory. The processor and the memory communicate with each other. The processor is configured to execute instructions stored in the memory, so that the network interface card performs the microservice call method according to any one of the first aspect or the implementations of the first aspect.

According to a sixth aspect, this application provides a network interface card. The network interface card includes a processor and a memory. The processor and the memory communicate with each other. The processor is configured to execute instructions stored in the memory, so that the network interface card performs the microservice call method according to any one of the second aspect or the implementations of the second aspect.

According to a seventh aspect, this application provides a computer-readable storage medium. The computer-readable storage medium includes instructions, and the instructions instruct a network interface card to perform the microservice call method according to any one of the first aspect or the implementations of the first aspect.

According to an eighth aspect, this application provides a computer-readable storage medium. The computer-readable storage medium includes instructions, and the instructions instruct a network interface card to perform the microservice call method according to any one of the second aspect or the implementations of the second aspect.

According to a ninth aspect, this application provides a computer program product including instructions. When the computer program product runs on a network interface card, the network interface card is enabled to perform the microservice call method according to any one of the first aspect or the implementations of the first aspect.

According to a tenth aspect, this application provides a computer program product including instructions. When the computer program product runs on a network interface card, the network interface card is enabled to perform the microservice call method according to any one of the second aspect or the implementations of the second aspect.

In this application, based on the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings for embodiments.

DESCRIPTION OF EMBODIMENTS

Figure 1:
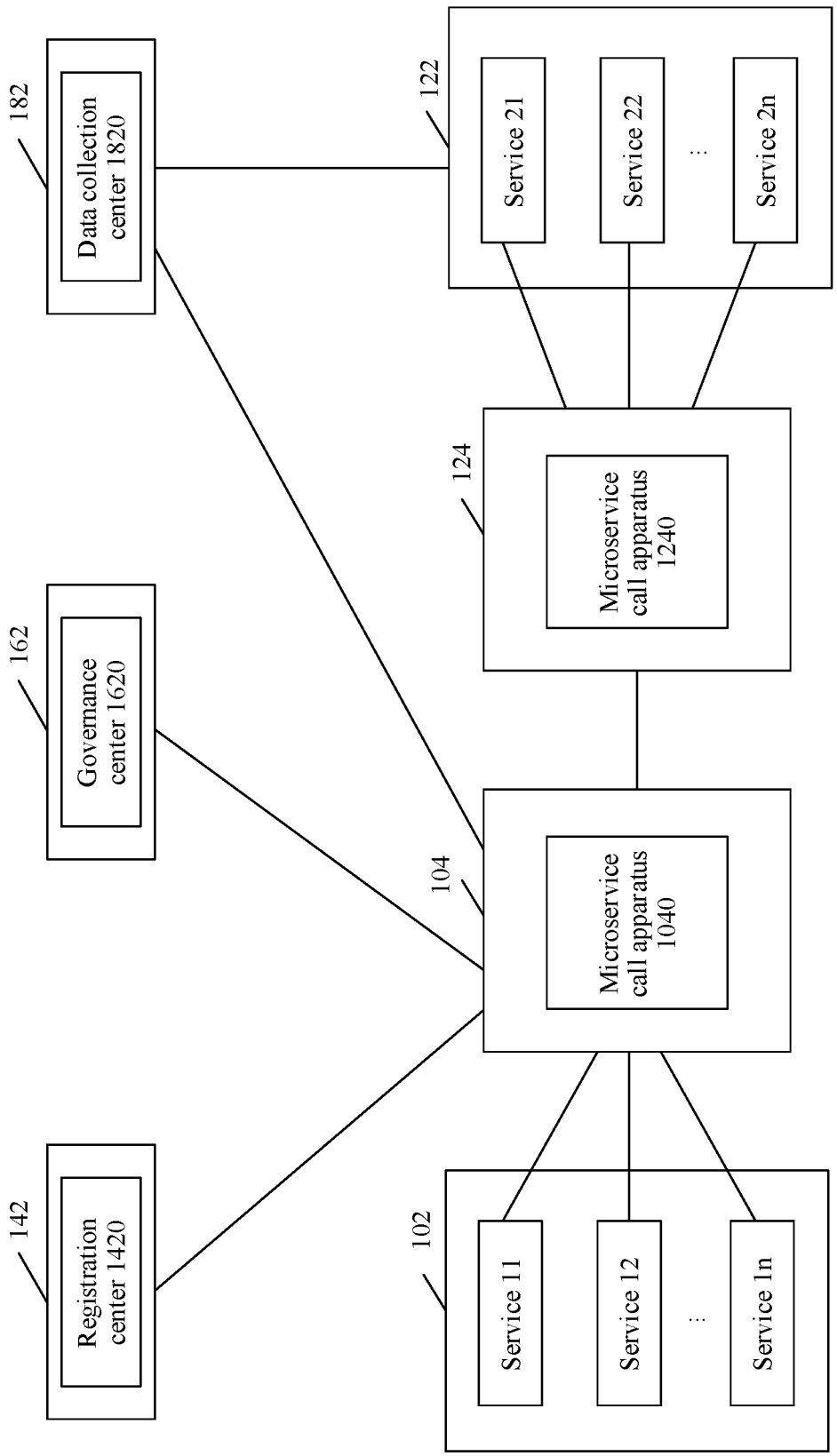
FIG. 1 is a diagram of a system architecture of a microservice call method according to an embodiment of this application.

The following describes the solutions in embodiments provided in this application with reference to the accompanying drawings in this application.

In the specification, claims, and accompanying drawings of this application, the terms "first", "second", and so on are intended to distinguish between similar objects but do not necessarily indicate an order or sequence. It should be understood that the terms used in such a way are interchangeable in appropriate circumstances. This is merely a discrimination manner that is used when objects having a same attribute are described in embodiments of this application.

To facilitate understanding of the technical solutions in this application, the following describes some technical terms in this application.

A microservice is a small service including a single application. Each microservice has its own process and can communicate with another microservice through a lightweight communication mechanism, such as an application programming interface (API) based on the hypertext transfer protocol (HTTP).

A microservice architecture is an architecture that splits an application (especially a large-scale application, such as an e-commerce system) into several microservices. In some examples, the microservice architecture may include a classic architecture such as Spring Cloud or Dubbo with low intrusiveness. Compared with a conventional monolithic architecture that integrates all functional services in one container, the microservice architecture implements service decoupling by decomposing functions into discrete services. Service teams separately maintain microservices corresponding to respective services. This reduces maintenance complexity and improves maintenance efficiency. In addition, when a single microservice is faulty, another microservice can still work. This improves system stability.

In some cases, there may be a call relationship between a plurality of microservices of an application. For example, in an e-commerce system, a microservice of a commodity system may further call a microservice of an evaluation system, to display a historical evaluation of a user on a commodity when commodity details are displayed. Service governance is to process a service call relationship in a distributed service framework. Service governance may be divided into the following parts: service registration and discovery, load balancing, fault handling and recovery (rate limiting, circuit breaker, timeout, and retry), gray release, service tracing, and the like.

Currently, an application based on the microservice architecture mainly implements service governance by using a service mesh. The service mesh is an infrastructure layer used to process communication between services (including microservices). An implementation of the service mesh is to allocate an independent proxy to each microservice. The proxy is also referred to as a side car. The proxy is responsible for processing communication, monitoring, and some security-related work between services, to provide functions such as service discovery, load balancing, encryption, identity authentication, authorization, and circuit breaker. The microservice is no longer responsible for processing logic of a service request, for example, performing load balancing based on a service request, but needs to complete only service processing.

For a large-scale application, one physical machine usually runs containers of a plurality of proxies, for example, containers of hundreds of proxies. However, a quantity of processes of the hundreds of proxies is far greater than a quantity of central processing unit (CPU) cores of the physical machine. When a CPU becomes a system bottleneck due to heavy concurrent request pressure, frequent process context switching is inevitably caused because a plurality of processes contend for the CPU. As a result, a service call delay is sharply increased, and application performance is reduced.

Therefore, an embodiment of this application provides a microservice call method. In the method, a network interface card is used to replace a proxy of a microservice, and functions to be implemented by distributed proxies are implemented together by the network interface card. The network interface card may receive a service call request generated by at least one first service deployed on a device (which is referred to as a first device in this application). Each of a plurality of first services is corresponding to one second service. The second service is used to process first data of a service call request generated by the first service corresponding to the second service. Then, the network interface card may send the service call request to the second service based on service governance logic related to the first data, to implement microservice calling.

In the foregoing method, functions such as service discovery, load balancing, encryption, identity authentication, authorization, and circuit breaker are decoupled from the microservice by using the network interface card, and low intrusiveness is maintained. In addition, the network interface card can process service call requests of different services together. This avoids a sharp increase in a service delay caused when proxies of different services contend for system resources including a CPU, and improves application performance.

In addition, functions implemented by proxies of different services are centralized on the network interface card. This reduces application complexity and facilitates operation and maintenance, and management and control of the application. Further, performing centralized processing by using the network interface card can implement traffic check in batches. In this way, overheads of interaction with a governance center in terms of data are reduced, and concurrency pressure of the governance center in terms of management is reduced. Certainly, performing centralized processing by using the network interface card can also report logs in batches. In this way, overheads of interaction with a data collection center in terms of data are reduced, and concurrency pressure of the data collection in terms of management is reduced.

FIG. 1 shows a possible application scenario according to an embodiment of this application. In this application scenario, a device 104 and a device 124 are network interface cards. The device 104 is programmable, and may be programmed to implement customized processing logic, for example, implement processing logic for a service call request. Certainly, the device 124 may also be programmable. In actual application, the device 104 may be a smart network interface card (smart NID), and the device 124 may be a common network interface card or a smart network interface card. The smart network interface card is a programmable network interface card, and the common network interface card is not a programmable network interface card.

A device 102 and a device 122 are computing devices. The computing device may be a physical machine, or may be a virtual machine obtained after virtualization. In actual application, the device 102 and the device 122 may be servers or cloud servers. A plurality of microservices are deployed on the device 102 and the device 122. Microservices deployed on the device 102 include a service 11, a service 12, . . . , and a service 1n. Microservices deployed on the device 122 include a service 21, a service 22, . . . , and a service 2n.

In this application scenario, there may further be a device 142, a device 162, and a device 182. Similarly, the device 142, the device 162, and the device 182 are computing devices, and the computing device may be a server or a cloud server. A registration center 1420 is deployed on the device 142. The registration center 1420 records a mapping relationship between a service and a service address. When a microservice calls another microservice, a service address of the called service may be obtained from the registration center 1420 for service calling. A governance center 1620 is deployed on the device 162, and the governance center 1620 records a service governance rule. When a microservice calls another microservice, the service governance rule may be obtained from the governance center 1620, and service governance logic is run based on the service governance rule. A data collection center 1820 is deployed on the device 182, and the data collection center 1820 records a service call log. When a microservice is faulty, an operation and maintenance engineer may perform troubleshooting and maintenance based on the service call log.

In this scenario, a microservice on the device 102 is a service caller, and a microservice on the device 122 is a service callee. For ease of differentiation, the device 102 may also be referred to as a first device, and the device 122 may also be referred to as a second device.

During implementation, a plurality of microservices (which are referred to as first services in this application) deployed on the device 102 may separately generate service call requests. Each first service is corresponding to one second service. The second service is used to process first data of a service call request generated by the first service corresponding to the second service. Then, the first services separately send the service call requests. A microservice call apparatus 1040 is deployed on the device 104 connected to the device 102. The microservice call apparatus 1040 is configured to receive a service call request generated by each of the plurality of first services such as the service 11, the service 12, . . . , and the service 1n deployed on the device 102, and then send the service call request to the second service based on service governance logic related to the first data.

A microservice call apparatus 1240 is deployed on the device 124. The microservice call apparatus 1240 receives the service call request sent by each of the plurality of first services, and then sends the service call request to the second service deployed on the device 122. In response to the service call request, the second service processes first data of the service call request generated by the first service corresponding to the second service, to obtain second data. The second service may generate a service call response based on the second data, and send the service call response to the microservice call apparatus 1240. When receiving the service call response, the microservice call apparatus 1240 sends the service call response to the first service to implement microservice calling.

In actual application, the microservice call apparatus 1040 deployed on the device 104 may further send a service provider list change subscription request to the device 142. In this way, when a service provider changes, the registration center 1420 deployed on the device 142 may send a change message for a service provider list to the microservice call apparatus 1040 deployed on the device 104. In this way, when determining, from the service provider list, an address of the second device providing the second service, the microservice call apparatus 1040 on the device 104 may determine, based on a changed service provider list, the address of the second device providing the second service. This avoids sending a service call request to an invalid service provider, and improves service reliability.

Similarly, the microservice call apparatus 1040 deployed on the device 104 may further send a service governance rule change subscription request to the device 162. In this way, when the service governance rule changes, the governance center 1620 on the device 162 may send a change message for the service governance rule to the microservice call apparatus 1040 deployed on the device 104. In this way, when running the service governance logic for the first data according to the service governance rule, the microservice call apparatus 1040 on the device 104 may run the service governance logic for the first data according to a changed service governance rule, to perform service governance.

It should be further noted that the foregoing scenario is described merely by using an example in which the microservice deployed on the device 102 is a service caller, and the microservice deployed on the device 122 is a service callee. In some implementations, the microservice deployed on the device 122 may alternatively be used as a service caller. When the microservice deployed on the device 122 is used as the service caller, the microservice call apparatus 1240 has a structure similar to that of the microservice call apparatus 1040. In addition, the microservice deployed on the device 102 may alternatively be used as a service callee. This is not limited in this embodiment of this application.

To facilitate understanding of the technical solutions of this application, the following describes a microservice call method in embodiments of this application from a perspective of interaction between the first service, the microservice call apparatus 1040, the microservice call apparatus 1240, the second service, the registration center 1420, the governance center 1620, and the data collection center 1820.

Figure 2:
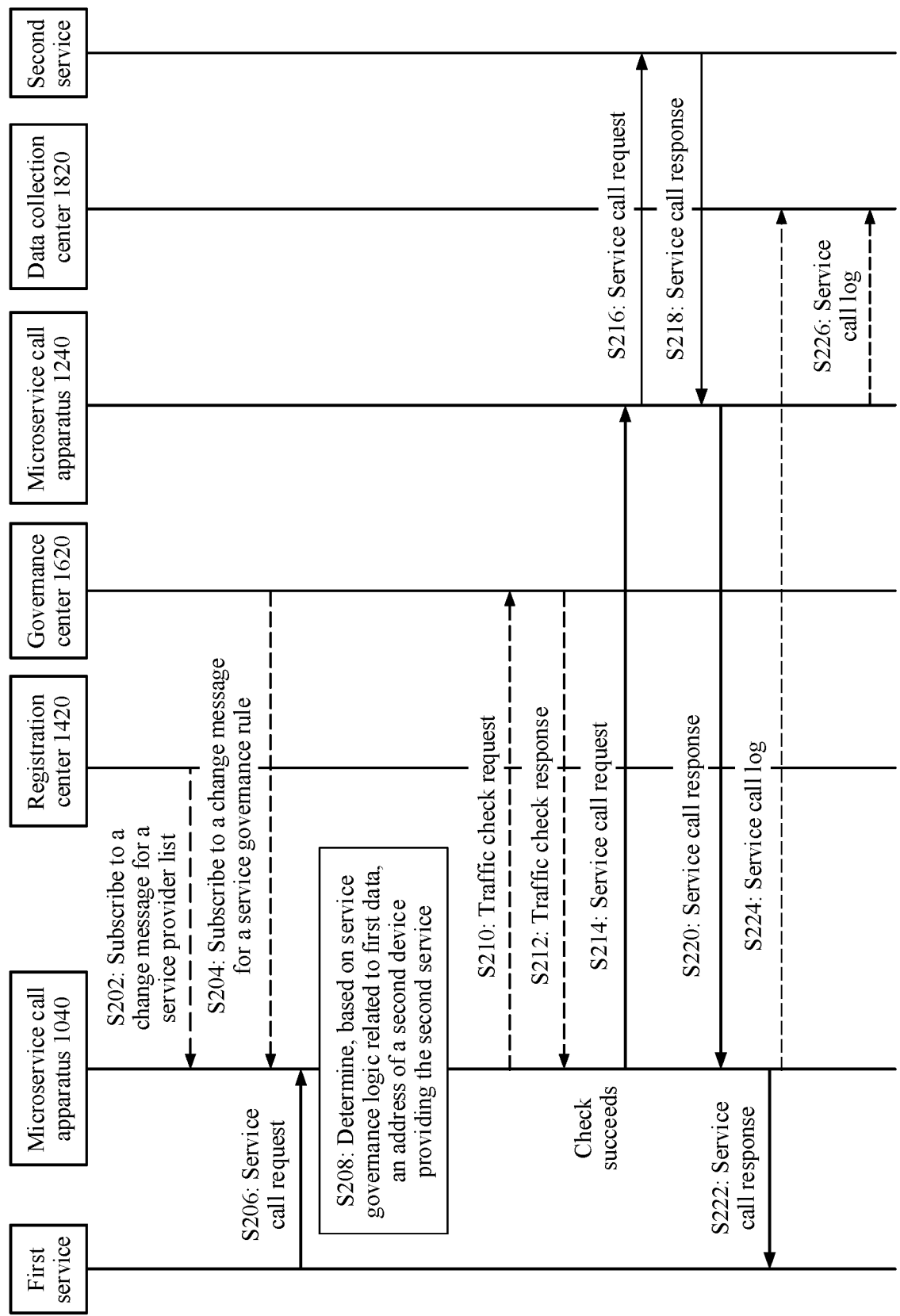
FIG. 2 is an interaction flowchart of a microservice call method according to an embodiment of this application.

FIG. 2 is a flowchart of a microservice call method, and the method includes the following steps.

S202: The microservice call apparatus 1040 subscribes to a change message for a service provider list.

The microservice call apparatus 1040 deployed on the device 104 may send a service provider list change subscription request to the registration center 1420 on the device 142. The service provider list change subscription request is used to request to subscribe to the change message for the service provider list. The service provider list change subscription request includes an identifier of the device 104. The registration center 1420 receives the service provider list change subscription request, and may add the identifier of the device 104 to a subscriber list. When the service provider list changes, the registration center 1420 may send the change message for the service provider list to a subscriber in the subscriber list. In this way, the microservice call apparatus 1040 deployed on the device 104 may obtain the change message for the service provider list.

It should be understood that in some embodiments, S202 may not be performed when the microservice call method is performed. For example, the microservice call apparatus 1040 may pre-obtain the service provider list, and perform a subsequent operation based on the pre-obtained service provider list.

S204: The microservice call apparatus 1040 subscribes to a change message for a service governance rule.

Service governance refers to processing of a service call relationship in a distributed service framework, and includes service registration and discovery, load balancing, fault handling and recovery (rate limiting, circuit breaker, timeout, and retry), gray release, service tracing, and the like. Based on this, the governance center 1620 may define a rule for service governance, that is, the service governance rule. The service governance rule may include a load balancing rule, a fault handling and recovery rule, and the like.

During implementation, the microservice call apparatus 1040 deployed on the device 104 may send a service governance rule change subscription request to the governance center 1620 on the device 162. The service governance rule change subscription request is used to request the change message for the service governance rule. Similarly, the service governance rule change subscription request includes the identifier of the device 104. When receiving the service governance rule change subscription request, the governance center 1620 adds the identifier of the device 104 to a subscriber list. When the service governance rule changes, the governance center 1620 may send the change message for the service governance rule to a subscriber in the subscriber list. In this way, the microservice call apparatus 1040 deployed on the device 104 may obtain the change message for the service governance rule.

It should be noted that the subscriber list maintained by the governance center 1620 is a subscriber list for the service governance rule, and the subscriber list maintained by the registration center 1420 is a subscriber list for a service provider address. That is, the governance center 1620 and the registration center 1420 maintain different subscriber lists.

It should be understood that in some embodiments, S204 may not be performed when the microservice call method is performed. For example, the microservice call apparatus 1040 may pre-obtain the service governance rule, and perform a subsequent operation based on the pre-obtained service governance rule.

S206: A plurality of first services deployed on the device 102 separately send service call requests.

Each of the plurality of first services (for example, the service 11, the service 12, . . . , and the service 1$n$ shown in FIG. 1) is corresponding to one second service. The second service is used to process first data of a service call request generated by the first service corresponding to the second service.

It should be noted that the first data is data that needs to be processed by the second service. First data that needs to be processed by all services initiating service call requests may be the same or may be different. This may be determined according to an actual requirement. Similarly, second services requested by the first services initiating the service call requests may be the same or may be different. This is not limited in this embodiment of this application.

S208: The microservice call apparatus 1040 determines, based on service governance logic related to the first data, an address of a second device providing the second service.

The service call request sent by the first service passes through the device 104. When receiving the service call request, the microservice call apparatus 1040 deployed on the device 104 may unload data of the service call request to obtain the first data. The first data includes at least a header of a data packet. In some cases, the first data may further include a body of the data packet. Then, the microservice call apparatus 1040 runs, based on the subscribed change message for the service governance rule in S204, the service governance logic for the first data by using a latest (that is, latest changed) service governance rule, to determine, from the service provider list, the address of the second device providing the second service.

It should be noted that when running the service governance logic for the first data to determine, from the service provider list, the address of the second device providing the second service, the microservice call apparatus 1040 may determine, from a latest (that is, latest changed) service provider list based on the subscribed change message for the service provider list in S202, the address of the second device providing the second service.

It should be understood that when S202 is not performed in the microservice call method, the microservice call apparatus 1040 may determine, based on the pre-obtained service provider list, the address of the second device providing the second service. When S204 is not performed in the microservice call method, the microservice call apparatus 1040 may run the service governance logic for the first data according to the pre-obtained service governance rule.

Figure 3:
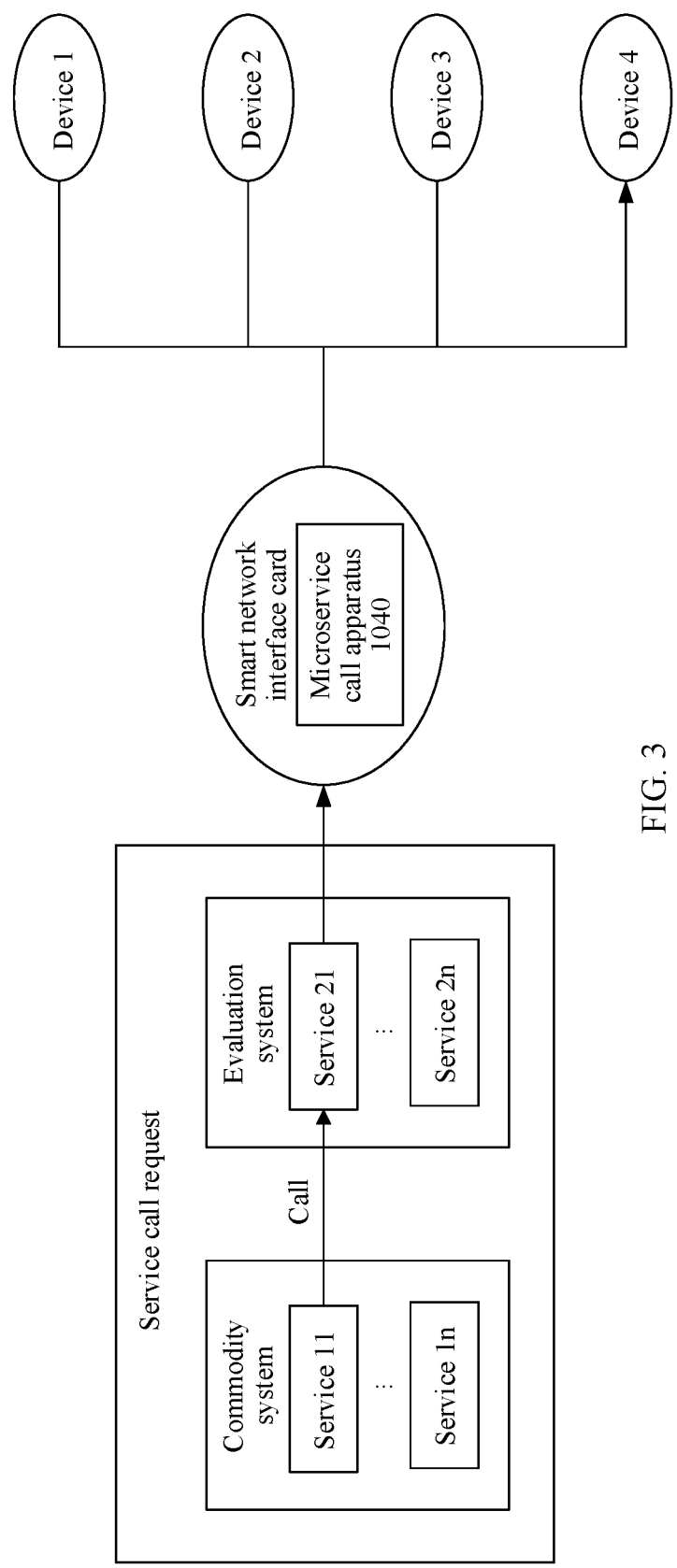
FIG. 3 is a diagram of processing logic of a microservice call method according to an embodiment of this application.

That the microservice call apparatus 1040 runs the service governance logic for the first data according to the service governance rule is performing service governance on the first data according to the service governance rule. For ease of understanding, this application further provides an example for description. In an example, as shown in FIG. 3, in an application scenario of an e-commerce system, a microservice, that is, a service 11, in a commodity system initiates a service call request, and the service call request indicates to process data of a commodity A by using an evaluation obtaining service, that is, a service 21, in an evaluation system, to obtain a historical evaluation on the commodity A. Devices that provide the evaluation obtaining service include a device 1 in East China, a device 2 in North China, a device 3 in South China, and a device 4 in Central China. Traffic load of the device 1 and traffic load of the device 2 are higher than traffic load of the device 3 and traffic load of the device 4, and the traffic load of the device 4 is the lowest. In this case, the microservice call apparatus 1040 on a smart network interface card determines, according to a load balancing rule, that an address of the device 4 is an address of a device that finally provides the evaluation obtaining service, and sends the service call request to a service at the address.

In actual application, the microservice call apparatus 1040 may create a worker thread, and implement, by using the worker thread, the operation of running the service governance logic to determine, from the service provider list, the address of the second device providing the second service.

S210: The microservice call apparatus 1040 sends a traffic check request to the governance center 1620.

During implementation, the microservice call apparatus 1040 may add the service call request and the address of the corresponding second device to a traffic check queue. The traffic check queue is a blocking queue. Then, the microservice call apparatus 1040 may send the traffic check request to the governance center 1620 in batches.

The microservice call apparatus 1040 may create a checker thread, that is, a checker thread. The checker thread may extract, from the traffic check queue, all service call requests (a plurality of service call requests initiated by a plurality of services deployed on the device 102) waiting for traffic check, generate a traffic check request, and send the traffic check request to the governance center 1620. In this way, the service call requests are sent to the governance center 1620 in batches.

S212: The microservice call apparatus 1040 receives a traffic check response returned by the governance center 1620. When a traffic check result in the traffic check response indicates that the check succeeds, S214 is performed.

The governance center 1620 may perform traffic check in batches for a plurality of service call requests in the traffic check request sent by the microservice call apparatus 1040, for example, may determine, by checking a source address or the like, whether the service call request is normal traffic or abnormal traffic generated by an attack performed by an outlaw. Then, the governance center 1620 may generate the traffic check response based on the traffic check result, and return the traffic check response to the microservice call apparatus 1040.

It should be noted that, after the microservice call apparatus 1040 receives the traffic check response returned by the governance center 1620, the checker thread may further wake up a worker thread corresponding to this batch of service call requests, and then block a new service call request (that is, a service call request that has not been sent to the governance center 1620) waiting in the traffic check queue.

When the traffic check result in the traffic check response received by the microservice call apparatus 1040 indicates that the check succeeds, the microservice call apparatus 1040 may perform a subsequent operation, for example, perform S214. When the traffic check result in the traffic check response received by the microservice call apparatus 1040 indicates that the check fails, the microservice call apparatus 1040 may end the current microservice call procedure.

It should be understood that S210 and S212 are only optional implementations for improving security. In some embodiments, neither S210 nor S212 may be performed when the microservice call method is performed. In other words, the microservice call apparatus 1040 may perform S214 after performing S208.

S214: The microservice call apparatus 1040 sends the service call request to the second service based on the address of the second device.

After determining the address of the second device providing the second service, the microservice call apparatus 1040 may set a destination address in the service call request to the address of the second device providing the second service, that is, the device 122, and then send the service call request to the second service.

S208 and S214 are an implementation in which the microservice call apparatus 1040 on the network interface card sends the service call request to the second service based on the service governance logic related to the first data. In another possible implementation of this embodiment of this application, the microservice call apparatus 1040 may send the service call request to the second service in another manner.

It should be noted that when the address, determined in S208, of the second device providing the second service is different from a destination address of the service call request in S206, the service call request sent by the microservice call apparatus 1040 in S214 is different from the service call request sent in S206. A main difference lies in that the destination address of the service call request sent in S214 is the address, re-determined in S208, of the second device providing the second service. Certainly, in some cases, a packet body of the service call request sent in S214 may also be different from a packet body of the service call request sent in S206.

S216: The microservice call apparatus 1240 sends the service call request to the second service when receiving the service call request.

The service call request sent by the microservice call apparatus 1040 to the second service passes through the device 124. When receiving the service call request, the microservice call apparatus 1240 deployed on the device 124 sends the service call request to the second service. It should be noted that, in consideration of network heterogeneity, when receiving the service call request, the microservice call apparatus 1240 may first unload the service call request, then regenerate a service call request based on unloaded data, and then send the regenerated service call request to the second service.

S218: The second service returns a service call response.

When receiving the service call request, the second service may process the first data in response to the service call request, to obtain second data. For example, if the service call request indicates the evaluation obtaining service in the evaluation system to process the commodity A to obtain the historical evaluation on the commodity A, the evaluation obtaining service may obtain the historical evaluation on the commodity A from all historical evaluations in response to the service call request.

The second service may generate the service call response according to the second data, where the service call response carries the second data, and then the second service returns the service call response.

S220: The microservice call apparatus 1240 sends the service call response to the microservice call apparatus 1040 when receiving the service call response.

The service call response returned by the second service passes through the device 124. When receiving the service call response, the microservice call apparatus 1240 deployed on the device 124 sends the service call response to the microservice call apparatus 1040. It should be noted that, similar to the service call request, when receiving the service call response, the microservice call apparatus 1240 may first unload the service call response, then regenerate a service call response based on unloaded data, and send the regenerated service call response to the microservice call apparatus 1040, so that the microservice call apparatus 1040 can identify the service call response.

S222: The microservice call apparatus 1040 sends the service call response to the first service corresponding to the second service.

When receiving the service call response, the microservice call apparatus 1040 may unload the service call response, then regenerate a service call response based on unloaded data, and send the regenerated service call response to the first service.

In this way, the first service calls the second service. It should be noted that service governance is completed on the device 104, and there is no intrusion into service logic. For example, when gray release is performed on the second service, neither call logic of the first service nor implementation logic of the second service needs to be modified, and gray release processing logic only needs to be completed on the device 104.

S224: The microservice call apparatus 1040 sends a service call log to the data collection center 1820.

In some possible implementations, the microservice call apparatus 1040 deployed on the device 104 may further generate the service call log based on at least one of the received service call request and the received service call response, and then send the service call log to the data collection center 1820 in batches. The microservice call apparatus 1040 may further set a log uploading cycle. In this way, the microservice call apparatus 1040 may send the service call log to the data collection center 1820 in batches based on the preset log uploading cycle.

S226: The microservice call apparatus 1240 sends a service call log to the data collection center 1820.

In some possible implementations, the microservice call apparatus 1240 deployed on the device 124 may further generate the service call log based on at least one of the received service call request and the received service call response, and then send the service call log to the data collection center 1820 in batches based on a preset cycle.

The microservice call apparatus 1040 and the microservice call apparatus 1240 upload the service call logs in batches, so that overheads of interaction between the device 104 and the data collection center 1820 in terms of data can be reduced, and overheads of interaction between the device 124 and the data collection center 1820 in terms of data can be reduced. This reduces costs.

The microservice call apparatus 1040 generates the service call log based on the received service call request and service call response, and the microservice call apparatus 1240 generates the service call log based on the received service call request and service call response, so that the data collection center 1820 can obtain complete log tracing data, including a time at which the first service initiates the service call request, a time at which the second service receives the service call request, a time at which the second service completes processing, and a time at which the first service receives the service call response. When some microservices are faulty, troubleshooting and maintenance can be performed based on the complete log tracing data.

It should be understood that S224 and S226 are merely optional implementations provided in this embodiment of this application. In some embodiments, neither S224 nor S226 may be performed when the microservice call method is performed.

In FIG. 2, steps identified by using dashed lines or dashed-line boxes are optional steps provided in this embodiment of this application. In some possible implementations, these steps may not be performed, or may be implemented in another manner. This is not limited in this embodiment of this application.

Based on the foregoing content description, in the microservice call method provided in this embodiment of this application, a network interface card is used to replace a proxy in a service mesh, and the network interface card processes together service call requests initiated by different services deployed on one device, to complete service governance. This avoids intrusion into service logic. In addition, the network interface card may process together service call requests initiated by different services. This avoids a problem of a sharp increase in a delay caused by contention of different services for a system resource including a CPU, reduces resource usage of an application, improves application response efficiency, and further improves application performance.

The foregoing describes in detail the microservice call method provided in embodiments of this application with reference to FIG. 1 to FIG. 3. The following describes, with reference to the accompanying drawings, a microservice call apparatus and a corresponding device provided in embodiments of this application.

Figure 4:
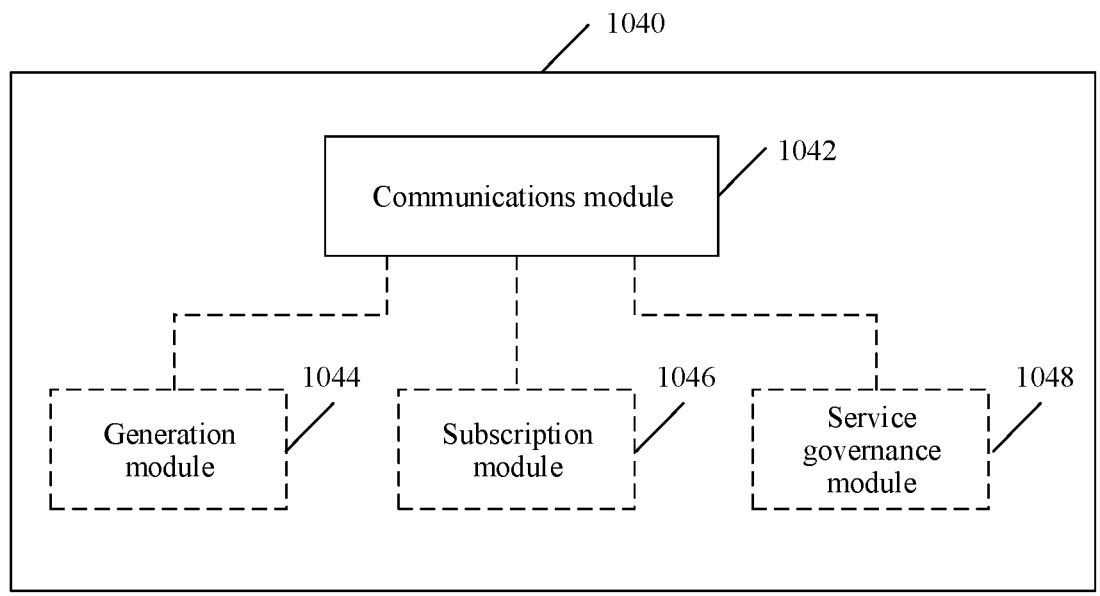
FIG. 4 is a schematic diagram of a structure of a microservice call apparatus according to an embodiment of this application.

FIG. 4 is a schematic diagram of a structure of a microservice call apparatus, and the microservice call apparatus 1040 includes:
- a communications module 1042, configured to receive service call requests separately generated by a plurality of first services deployed on a first device, where each of the plurality of first services is corresponding to one second service, and the second service is used to process first data of a service call request generated by the first service corresponding to the second service.

The communications module 1042 is further configured to send the service call request to the second service based on service governance logic related to the first data.

In some possible implementations, the communications module 1042 is configured to:
- determine, based on the service governance logic related to the first data, an address of a second device providing the second service; and
- send the service call request to the second service based on the address of the second device.

In some possible implementations, the communications module 1042 is further configured to:
- send a traffic check request to a governance center, where the traffic check request is used to perform traffic check for N service call requests, and N is a positive integer;
- receive a traffic check result sent by the governance center; and
- send the service call request to the second service when the traffic check result indicates that the check succeeds.

In some possible implementations, the communications module is further configured to:
- receive a service call response sent by the second service, where the service call response includes second data obtained by processing the first data by the second service.

The apparatus 1040 further includes:
- a generation module 1044, configured to generate a service call log based on at least one of the service call request and the service call response.

The communications module 1042 is further configured to:
- send the service call log to a data collection center in batches.

In some possible implementations, the apparatus 1040 further includes:
- a subscription module 1046, configured to subscribe to a change message for a service provider list, to determine, from a changed service provider list, the address of the second device providing the second service.

In some possible implementations, the apparatus 1040 further includes:
- the subscription module 1046, configured to subscribe to a change message for a service governance rule; and
- a service governance module 1048, configured to run the service governance logic for the first data according to a changed service governance rule.

In some possible implementations, the network interface card is a smart network interface card.

The microservice call apparatus 1040 according to this embodiment of this application may correspondingly perform the methods described in embodiments of this application, and the foregoing and other operations and/or functions of the modules of the microservice call apparatus 1040 are separately used to implement corresponding procedures of the methods in the embodiment shown in FIG. 2. For brevity, details are not described herein again.

Figure 5:
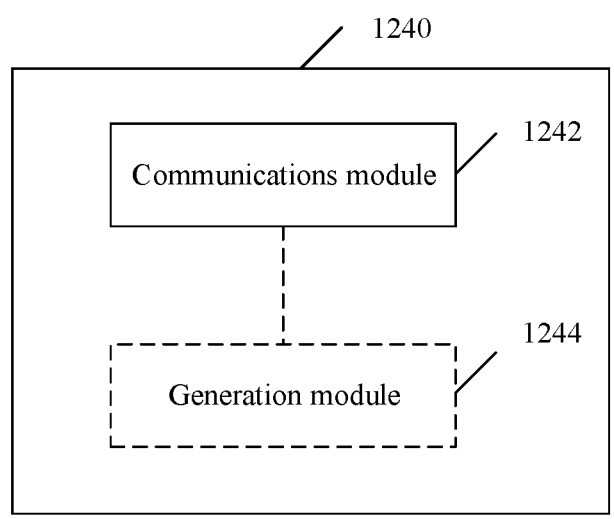
FIG. 5 is a schematic diagram of a structure of a microservice call apparatus according to an embodiment of this application.

FIG. 5 is a schematic diagram of a structure of a microservice call apparatus, and the microservice call apparatus 1240 includes:
- a communications module 1242, configured to receive service call requests sent by a plurality of first services, where each of the plurality of first services is corresponding to one second service, and the second service is used to process first data of a service call request generated by the first service corresponding to the second service.

The communications module 1242 is further configured to send the service call request to the second service.

The communications module 1242 is further configured to receive a service call response sent by the second service, where the service call response includes second data obtained by processing the first data by the second service.

The communications module 1242 is further configured to send the service call response to the first service corresponding to the second service.

In some possible implementations, the apparatus 1240 further includes:
- a generation module 1244, configured to generate a service call log based on at least one of the service call request and the service call response.

The communications module 1242 is further configured to send the service call log to a data collection center in batches.

In some possible implementations, the network interface card is a smart network interface card.

The microservice call apparatus 1240 according to this embodiment of this application may correspondingly perform the methods described in embodiments of this application, and the foregoing and other operations and/or functions of the modules of the microservice call apparatus 1240 are separately used to implement corresponding procedures of the methods in the embodiment shown in FIG. 2. For brevity, details are not described herein again.

An embodiment of this application further provides a device. The device may be a network interface card, and is configured to implement a function of the microservice call apparatus 1040 in the embodiment shown in FIG. 4.

Figure 6:
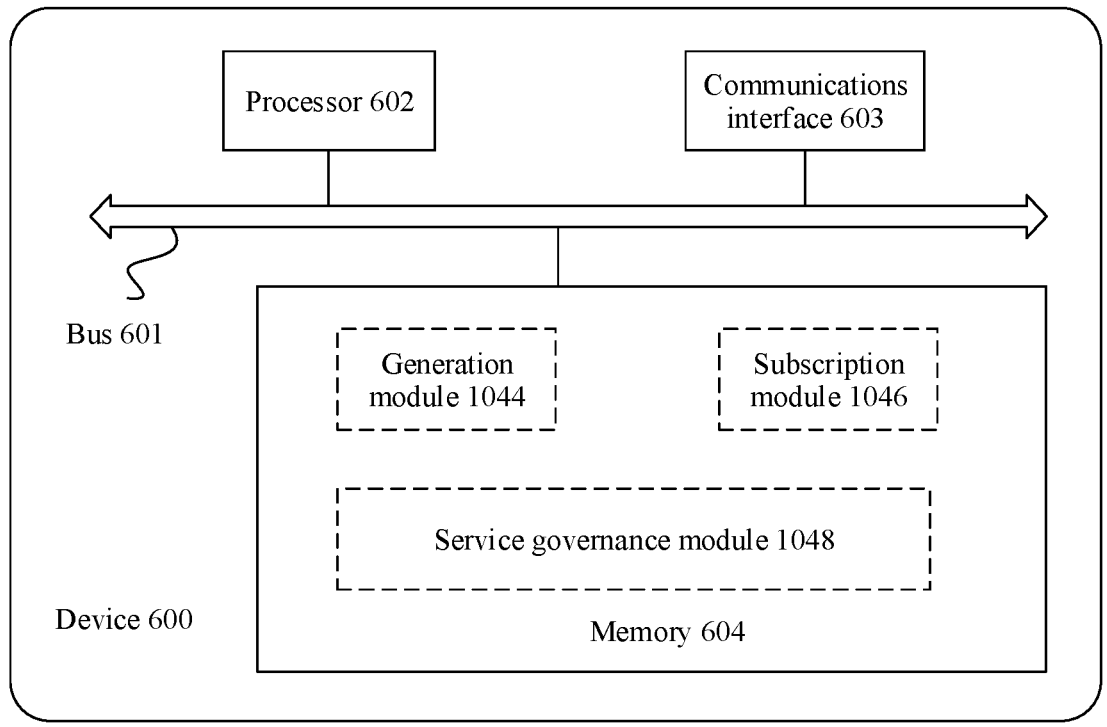
FIG. 6 is a schematic diagram of a structure of a device according to an embodiment of this application.

FIG. 6 is a schematic diagram of a structure of a device. As shown in FIG. 6, a device 600 includes a bus 601, a processor 602, a communications interface 603, and a memory 604. The processor 602, the memory 604, and the communications interface 603 communicate with each other through the bus 601. The bus 601 may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 6, but this does not mean that there is only one bus or only one type of bus. The communications interface 603 is configured to communicate with the outside. For example, the communications interface 603 is configured to receive a service call request, send a service call request, or the like.

The processor 602 may be a central processing unit (CPU). The memory 604 may include a volatile memory, for example, a random access memory (RAM). Alternatively, the memory 604 may include a non-volatile memory, for example, a read-only memory (ROM), a flash memory, an HDD, or an SSD.

The memory 604 stores executable code, and the processor 602 executes the executable code to perform the foregoing microservice call method.

When the embodiment shown in FIG. 4 is implemented, and the modules of the microservice call apparatus 1040 described in the embodiment of FIG. 4 are implemented by using software, software or program code required for performing functions of the generation module 1044, the subscription module 1046, and the service governance module 1048 in FIG. 4 is stored in the memory 604. A function of the communications module 1042 is implemented by using the communications interface 603. The communications interface 603 receives service call requests separately generated by a plurality of first services deployed on a first device, and transmits the service call requests to the processor 602 through the bus 601. The processor 602 executes program code that is corresponding to each module and that is stored in the memory 604, to perform the microservice call method, to send the service call requests to second services by using the communications interface 603 based on service governance logic related to first data, to implement microservice calling.

An embodiment of this application further provides another device. The device may be a network interface card, including a common network interface card or a smart network interface card, and is configured to implement a function of the microservice call apparatus 1240 in the embodiment shown in FIG. 5.

Figure 7:
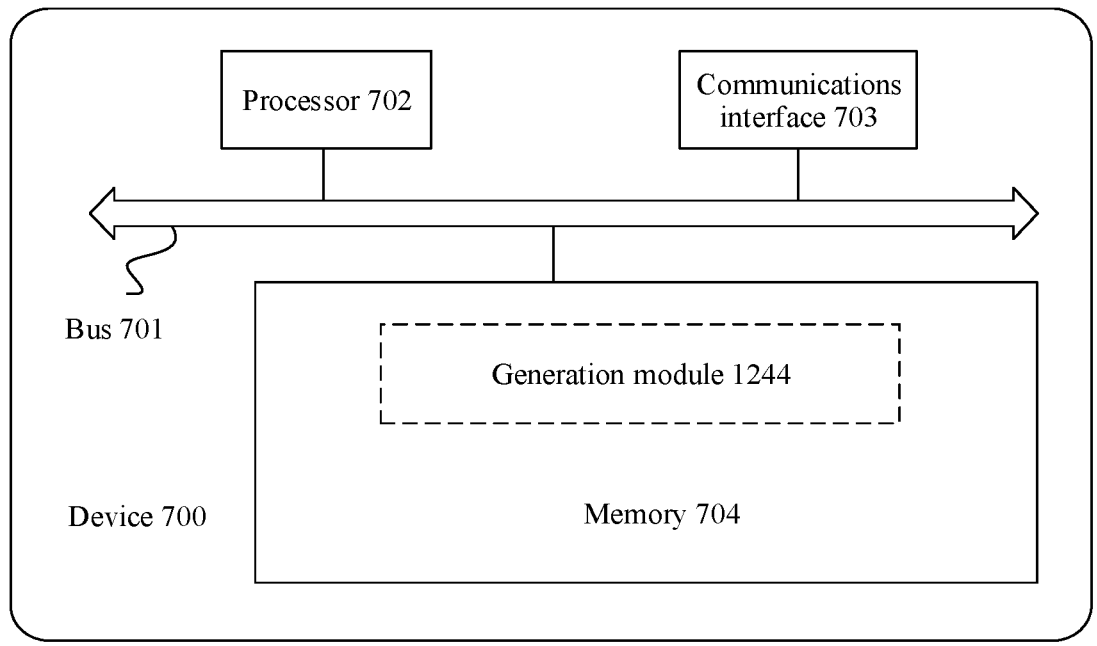
FIG. 7 is a schematic diagram of a structure of a device according to an embodiment of this application.

FIG. 7 is a schematic diagram of a structure of a device. As shown in FIG. 7, a device 700 includes a bus 701, a processor 702, a communications interface 703, and a memory 704. The processor 702, the memory 704, and the communications interface 703 communicate with each other through the bus 701.

The memory 704 stores executable code, and the processor 702 executes the executable code to perform the foregoing microservice call method.

When the embodiment shown in FIG. 5 is implemented, and the modules of the microservice call apparatus 1240 described in the embodiment of FIG. 5 are implemented by using software, software or program code required for performing a function of the generation module 1244 in FIG. 5 is stored in the memory 704. A function of the communications module 1242 is implemented by using the communications interface 703. The communications interface 703 receives service call requests separately sent by a plurality of first services, and transmits the service call requests to the processor 702 through the bus 701. The processor 702 executes program code that is corresponding to each module and that is stored in the memory 704, to perform the microservice call method.

An embodiment of this application further provides a computer-readable storage medium. The computer-readable storage medium includes instructions, and the instructions instruct a network interface card to perform the foregoing microservice call method applied to the microservice call apparatus 1040.

An embodiment of this application further provides a computer-readable storage medium. The computer-readable storage medium includes instructions, and the instructions instruct a network interface card to perform the foregoing microservice call method applied to the microservice call apparatus 1240.

An embodiment of this application further provides a computer program product. When the computer program product is executed by a network interface card, the network interface card performs any one of the foregoing microservice call methods. The computer program product may be a software installation package. If any one of the foregoing microservice call methods needs to be used, the computer program product may be downloaded, and the computer program product may be executed on a network interface card.

What is claimed is:

1. A microservice call method, comprising:
receiving, by a network interface card, service call requests separately generated by a plurality of first services deployed on a first device, wherein each of the plurality of first services corresponds to one second service, and the second service is used to process first data of a service call request generated by the first service corresponding to the second service; and
sending, by the network interface card, the service call request to the second service based on service governance logic related to the first data.

2. The method according to claim 1, wherein the sending, by the network interface card, the service call request to the second service based on service governance logic related to the first data comprises:
determining, by the network interface card based on the service governance logic related to the first data, an address of a second device providing the second service; and
sending, by the network interface card, the service call request to the second service based on the address of the second device.

3. The method according to claim 1, further comprising:
sending, by the network interface card, a traffic check request to a governance center, wherein the traffic check request is used to perform traffic check for N service call requests and N is a positive integer;
receiving, by the network interface card, a traffic check result sent by the governance center; and
sending, by the network interface card, the service call request to the second service in response to the traffic check result indicating that the traffic check succeeds.

4. The method according to claim 1, further comprising:
receiving, by the network interface card, a service call response sent by the second service, wherein the service call response comprises second data obtained by processing the first data by the second service;
generating, by the network interface card, a service call log based on at least one of the service call request and the service call response; and
sending, by the network interface card, the service call log to a data collection center in batches.

5. The method according to claim 1, further comprising:
subscribing, by the network interface card, to a change message for a service provider list to determine, from a changed service provider list, the address of the second device providing the second service.

6. The method according to claim 1, further comprising:
subscribing, by the network interface card, to a change message for a service governance rule; and
running, by the network interface card, the service governance logic for the first data according to a changed service governance rule.

7. The method according to claim 1, wherein the network interface card is a smart network interface card.

8. A microservice call method, comprising:
receiving, by a network interface card, service call requests sent by a plurality of first services, wherein each of the plurality of first services corresponds to one second service, and the second service is used to process first data of a service call request generated by the first service corresponding to the second service;

sending, by the network interface card, the service call request to the second service;

receiving, by the network interface card, a service call response sent by the second service, wherein the service call response comprises second data obtained by processing the first data by the second service; and sending, by the network interface card, the service call response to the first service corresponding to the second service.

9. The method according to claim 8, further comprising:
generating, by the network interface card, a service call log based on at least one of the service call request and the service call response; and sending, by the network interface card, the service call log to a data collection center in batches.

10. The method according to claim 8, wherein the network interface card is a smart network interface card.

11. A network interface card, wherein the network interface card comprises a processor and a memory, wherein the processor is configured to execute instructions stored in the memory to enable the network interface card to:

receive service call requests separately generated by a plurality of first services deployed on a first device, wherein each of the plurality of first services corresponds to one second service, and the second service is used to process first data of a service call request generated by the first service corresponding to the second service; and send the service call request to the second service based on service governance logic related to the first data.

12. The network interface card according to claim 11, wherein the processor is further configured to execute instructions stored in the memory to enable the network interface card to:

determine, based on the service governance logic related to the first data, an address of a second device providing the second service; and send the service call request to the second service based on the address of the second device.

13. The network interface card according to claim 11, wherein the processor is further configured to execute instructions stored in the memory to enable the network interface card to:

send a traffic check request to a governance center, wherein the traffic check request is used to perform traffic check for N service call requests, and N is a positive integer;

receive a traffic check result sent by the governance center; and send the service call request to the second service in response to the traffic check result indicating that the traffic check succeeds.

14. The network interface card according to claim 11, the processor is further configured to execute instructions stored in the memory to enable the network interface card to:

receive a service call response sent by the second service, wherein the service call response comprises second data obtained by processing the first data by the second service;

generate a service call log based on at least one of the service call request and the service call response; and send the service call log to a data collection center in batches.

15. The network interface card according to claim 11, wherein the processor is further configured to execute instructions stored in the memory to enable the network interface card to:

subscribe to a change message for a service provider list to determine, from a changed service provider list, the address of the second device providing the second service.

16. The network interface card according to claim 11, the processor is further configured to execute instructions stored in the memory to enable the network interface card to:

subscribe to a change message for a service governance rule; and run the service governance logic for the first data according to a changed service governance rule.

17. A network interface card, wherein the network interface card comprises a processor and a memory, and wherein the processor is configured to execute instructions stored in the memory to enable the network interface card to:

receive service call requests sent by a plurality of first services, wherein each of the plurality of first services corresponds to one second service, and the second service is used to process first data of a service call request generated by the first service corresponding to the second service;

send the service call request to the second service;

receive a service call response sent by the second service, wherein the service call response comprises second data obtained by processing the first data by the second service; and send the service call response to the first service corresponding to the second service.

18. The network interface card according to claim 17, wherein the processor is further configured to execute instructions stored in the memory to enable the network interface card to:

generate a service call log based on at least one of the service call request and the service call response; and send the service call log to a data collection center in batches.

* * * * *